(12) United States Patent
Laemmle

(10) Patent No.: US 11,554,679 B2
(45) Date of Patent: Jan. 17, 2023

(54) INDUCTION CHARGING DEVICE

(71) Applicant: Mahle International GmbH, Stuttgart (DE)

(72) Inventor: Christopher Laemmle, Stuttgart (DE)

(73) Assignee: Mahle International GmbH

( * ) Notice: Subject to any disclaimer, the term of this patent is extended or adjusted under 35 U.S.C. 154(b) by 311 days.

(21) Appl. No.: 16/978,675

(22) PCT Filed: Mar. 4, 2019

(86) PCT No.: PCT/EP2019/055310
§ 371 (c)(1),
(2) Date: Sep. 4, 2020

(87) PCT Pub. No.: WO2019/170600
PCT Pub. Date: Sep. 12, 2019

(65) Prior Publication Data
US 2020/0398681 A1    Dec. 24, 2020

(30) Foreign Application Priority Data

Mar. 8, 2018 (DE) .......................... 102018203556.3

(51) Int. Cl.
*B60L 53/12* (2019.01)
*H02J 50/10* (2016.01)
(Continued)

(52) U.S. Cl.
CPC ............. *B60L 53/12* (2019.02); *B60L 53/122* (2019.02); *B60L 53/302* (2019.02); *H01F 27/10* (2013.01);
(Continued)

(58) Field of Classification Search
CPC .. B60L 53/12; B60L 2270/147; B60L 53/302; H02J 50/10; H02J 50/70; H01F 38/14; H01F 27/10; H01F 27/36
(Continued)

(56) References Cited

U.S. PATENT DOCUMENTS 9,522,604 B2    12/2016   Altunyurt et al.
9,662,992 B2    5/2017    Doepke
(Continued)

FOREIGN PATENT DOCUMENTS

DE    102011088112 A1    6/2013
DE    102015111852 A1    2/2016
(Continued)

OTHER PUBLICATIONS

English abstract for JP-2010268664.

*Primary Examiner* — Richard V Muralidar
(74) *Attorney, Agent, or Firm* — Fishman Stewart PLLC

(57) ABSTRACT

An induction charging device for an electrically operated motor vehicle may include at least one charging assembly. The at least one charging assembly may include a charging coil, a ferrite assembly, a metal shielding plate, and a temperature-control assembly through which a fluid is flowable. The charging coil may be inductively couplable to a primary coil such that a motor vehicle battery is inductively chargeable. The ferrite assembly may include a plurality of rotatable ferrite plates arranged next to one another. When in a closed position, a respective ferrite plate may be arranged parallel to the charging coil and may shield the metal shielding plate from the charging coil. When in an open position, the respective ferrite plate may be arranged at an angle relative to the charging coil and may partially shield the metal shielding plate from the charging coil.

20 Claims, 1 Drawing Sheet

(51) Int. Cl.
*H02J 50/70* (2016.01)
*B60L 53/302* (2019.01)
*B60L 53/122* (2019.01)
*H01F 27/10* (2006.01)
*H01F 27/36* (2006.01)
*H02J 50/00* (2016.01)
*H01F 38/14* (2006.01)
*H02J 7/00* (2006.01)
*H02J 7/02* (2016.01)

(52) U.S. Cl.
CPC ........... *H01F 27/36* (2013.01); *H01F 27/363* (2020.08); *H01F 38/14* (2013.01); *H02J 7/0042* (2013.01); *H02J 7/02* (2013.01); *H02J 50/005* (2020.01); *H02J 50/10* (2016.02); *H02J 50/70* (2016.02); *B60L 2270/147* (2013.01)

(58) Field of Classification Search
USPC ........................................................ 320/108
See application file for complete search history.

(56) References Cited

U.S. PATENT DOCUMENTS

| | | | |
|---|---|---|---|
| 9,787,138 B2 | 10/2017 | Ichikawa | |
| 10,658,100 B2* | 5/2020 | Yuasa | ................... H01F 38/14 |
| 10,756,572 B2 | 8/2020 | Ansari et al. | |
| 10,763,700 B2* | 9/2020 | Yuasa | ................... B60L 53/122 |
| 2019/0074720 A1 | 3/2019 | Krammer | |
| 2020/0020478 A1* | 1/2020 | Nishimura | ............... B60L 53/12 |

FOREIGN PATENT DOCUMENTS

| | | | |
|---|---|---|---|
| DE | 102016205352 A1 | 10/2017 | |
| DE | 102017200465 A1 | 11/2017 | |
| DE | 102017067 | * | 9/2019 |
| JP | 2010268664 A | 11/2010 | |
| WO | WO 2019170838 | * | 9/2019 |

* cited by examiner

INDUCTION CHARGING DEVICE

CROSS-REFERENCE TO RELATED APPLICATIONS

This application claims priority to International Patent Application No. PCT/EP2019/055310, filed on Mar. 4, 2019, and German Patent Application No. DE 10 2018 203 556.3, filed on Mar. 8, 2018, the contents of both of which are hereby incorporated by reference in their entirety.

TECHNICAL FIELD

The invention relates to an induction charging device for a partially or fully electrically operated motor vehicle.

BACKGROUND

Induction charging devices are already known from the prior art and are employed for the contactless charging of a battery in a motor vehicle. There, an external primary coil is inductively coupled to a secondary coil in the motor vehicle. An alternating current flows through the primary coil which generates an electromagnetic field about the primary coil. The electromagnetic field induces an alternating current in the secondary coil which is rectified by the power electronics and fed to the battery.

In order to reduce the charging losses in the induction charging device, the electromagnetic field about the secondary coil is influenced by a magnetic ferrite plate. Nevertheless, electromagnetic field emissions develop in the induction charging device whose magnitude increases with the charging power. The field emissions can be removed by means of a metal plate—mostly of aluminium—in order to protect electronic devices in the motor vehicle and exclude a negative effect on the health of a human being.

During the shielding of the electromagnetic field, eddy currents are generated in the metal plate which can lead to a severe heat development in the metal plate. The generated waste heat can damage the power electronics in the induction charging device and therefore has to be discharged to the outside. For this purpose, a cooling arrangement through which a cooling fluid can flow can be heat-transmittingly arranged on the metal plate, so that the waste heat generated in the induction charging device is transferred via the metal plate to the cooling fluid.

The waste heat can be dissipated to the surroundings or utilised for heating a lubricant in the motor vehicle, such as is proposed for example in DE 10 2011 088 112 A1. Disadvantageously the motor vehicle is not in operation during the charging so that the generated waste heat is not utilisable and dissipated to the surroundings. Furthermore, the quantity of the waste heat generated during the charging is relatively low because of small currents and high voltages.

SUMMARY

The object of the invention therefore is to state an improved or at least alternative embodiment for an induction charging device of the generic type with which the described disadvantages are overcome.

According to the invention, this object is solved through the subject matter of the independent claim(s). Advantageous embodiments are the subject matter of the dependent claim(s).

The present invention is based on the general idea of conducting the electromagnetic field in an induction charging device for a partially or fully electrically operated motor vehicle dependent on the waste heat to be generated. Here, the induction charging device comprises at least one charging assembly with a charging coil and a temperature-control assembly, through which a fluid can flow and which is heat-transmittingly coupled to the charging device. The charging coil of the charging assembly is inductively coupleable to a primary coil so that a battery in the motor vehicle is inductively chargeable. The charging assembly, furthermore, comprises a ferrite assembly that is arranged on the vehicle side on the charging coil and a metal shielding plate arranged on the vehicle side on the ferrite assembly for shielding electromagnetic field emissions. Thus, the ferrite assembly is arranged between the charging coil and the metal shielding plate. According to the invention, the ferrite assembly comprises multiple ferrite plates arranged next to one another, which are each rotatable into a closed position and into an open position. Here, the respective ferrite plate in the closed position is arranged parallel to the charging coil, so that the metal shielding plate is shielded from the charging coil. Accordingly, comparatively little waste heat is generatable in metal shielding plate. In the open position, the respective ferrite plate is arranged at an angle to the charging coil so that the metal shielding plate is partially shielded from the charging coil. Accordingly, a comparatively high waste heat is generatable in the metal shielding plate.

In the induction charging device according to the invention, the ferrite assembly is arranged between the charging coil and the metal shielding plate. When all or at least some of the multiple ferrite plates are in the closed position, the metal shielding plate can be at least in sections shielded from the charging coil and the electromagnetic field can be diverted, at least in regions, back to the charging coil. The waste heat generated in the metal shielding plate remains low. When all or at least some of the multiple ferrite plates are in the open position, the electromagnetic field can reach the metal shielding plate almost without obstruction and the waste heat generated in the metal shielding plate is high. The temperature-control assembly is heat-transmittingly coupled to the charging assembly and the waste heat generated in the metal shielding plate can be transmitted to the fluid in the temperature-control assembly. Advantageously, the waste heat can then be used for preheating a lubricating oil in an engine, for preheating the engine, for preheating the battery or even for preheating an interior of the motor vehicle. In the induction charging device according to the invention, the quantity of the waste heat emitted to the fluid in the temperature-control assembly and because of this also the heating output of the temperature control device are advantageously adaptable.

In the closed position, the respective ferrite plate is orientated parallel to the charging coil and shields the same from the metal shielding plate. The metal shielding plate practically encloses the charging coil on the vehicle side so that electromagnetic field emissions towards the motor vehicle can be shielded. In the open position, the respective ferrite plate is arranged at an angle to the charging coil that can vary between 30° and 90°. Altogether, multiple shielding positions of the ferrite assembly and because of this also different degrees of shielding are achievable in the induction charging device according to the invention. Accordingly, the quantity of the waste heat generated in the metal shielding plate that can be given off to the fluid and, because of this, also the heating output of the temperature-control assembly are advantageously adaptable.

In a further development of the induction charging device according to the invention it is advantageously provided that the charging assembly is switchable into a charging state, wherein in the charging state an induction alternating current flows in the charging coil and the battery of the motor vehicle is chargeable. In the charging state, the charging coil is inductively coupled to the primary coil and the induction alternating current in the charging coil is generated through the electric field generated about the primary coil. Advantageously it can be provided that in the charging state at least some of the respective ferrite plates are rotated into the closed position. In the closed position, the respective ferrite plate is orientated parallel to the charging coil and shields the metal shielding plate from the charging coil. The electromagnetic field is diverted to the charging coil and the charging power of the induction device is high. In the metal shielding plate, a low quantity of the waste heat is generated and the heating output of the temperature control device is low. In the charging state, the motor vehicle is usually not in operation and because of this a low waste heat and a high charging power is advantageous.

In a further development of the induction charging device according to the invention it is advantageously provided that the charging device is switchable into a heating state, wherein in the heating state an alternating current flows in the charging coil and a waste heat is generatable in the charging assembly. Advantageously, at least some of the respective ferrite plates can be rotated in the heating state into the open position. Through the alternating current, an electromagnetic field is generated about the charging coil which is then conducted to the metal shielding plate. In the metal shielding plate, eddy currents are generated and because of this a large amount of waste heat is generated. The heating output of the temperature-control assembly is correspondingly high.

Advantageously it can be provided that the temperature-control assembly comprises at least one fluid tube which heat-transmittingly lies against the metal shielding plate. Alternatively, the temperature control device can comprise at least one fluid passage which is formed in the metal shielding plate. Advantageously, the temperature-control assembly can be flowed through by the fluid from a fluid inlet to a fluid outlet and, via the fluid inlet and via the fluid outlet, be fluidically connectable to a vehicle cooling system.

Advantageously, the charging device can comprise a shell-like charging housing in which the charging coil and the ferrite assembly are arranged. Here, the metal shielding plate can form a cover of the charging housing and close the same on the vehicle side. In particular, the number of the individual parts in the induction charging device and because of this also the manufacturing costs can thus be reduced. So as not to influence the electromagnetic field, the charging device can be formed from an electrical insulator, preferably plastic. Advantageously, the multiple ferrite plates of the ferrite assembly can then be rotatably fixed on the charging housing of the same. Then, the multiple ferrite plates can be formed for example strip-shaped and rotatably mounted on the charging housing on both sides. For adjusting the ferrite plates between the closed position and the open position, an adjusting device can be provided.

In summary, the electromagnetic field in the induction charging device according to the invention can be influenced and because of this the amount of the waste heat generated in the metal shielding plate changed. Because of this, the temperature-control assembly can be advantageously used for preheating a lubricating oil in an engine, for preheating the engine, for preheating the battery or even for preheating an interior of the motor vehicle.

Further important features and advantageous of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically

DETAILED DESCRIPTION

Figure 1:
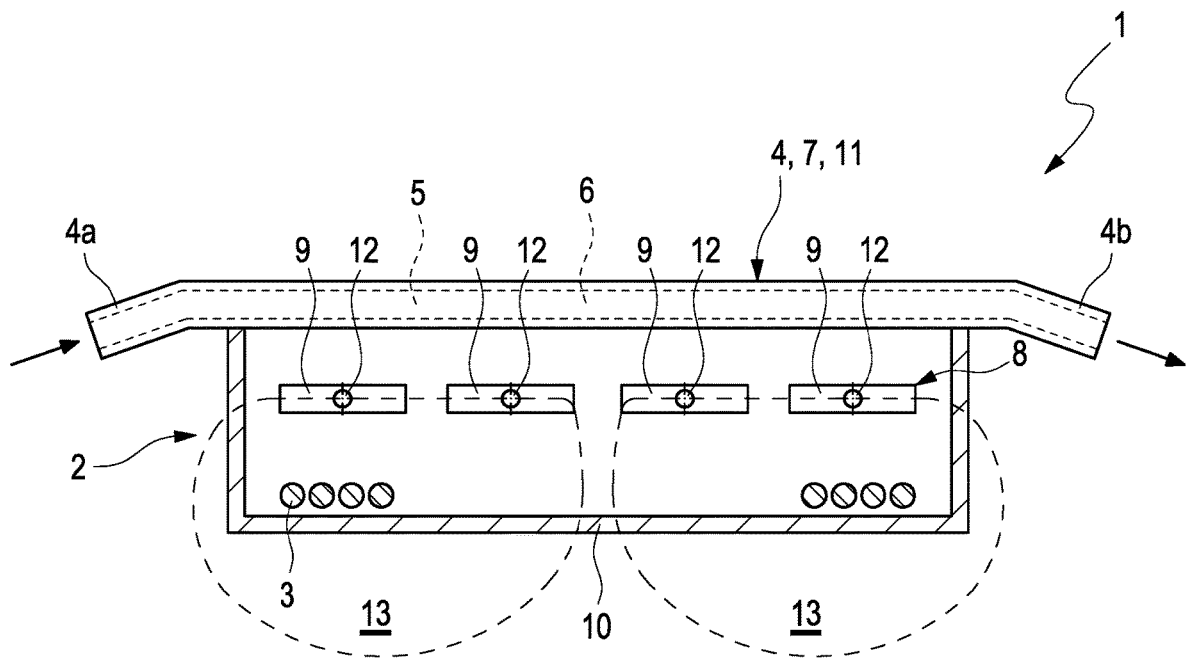
FIG. 1 shows a sectional view of an induction charging device according to the invention with charging assembly whose multiple ferrite plates are in a closed position.
Figure 2:
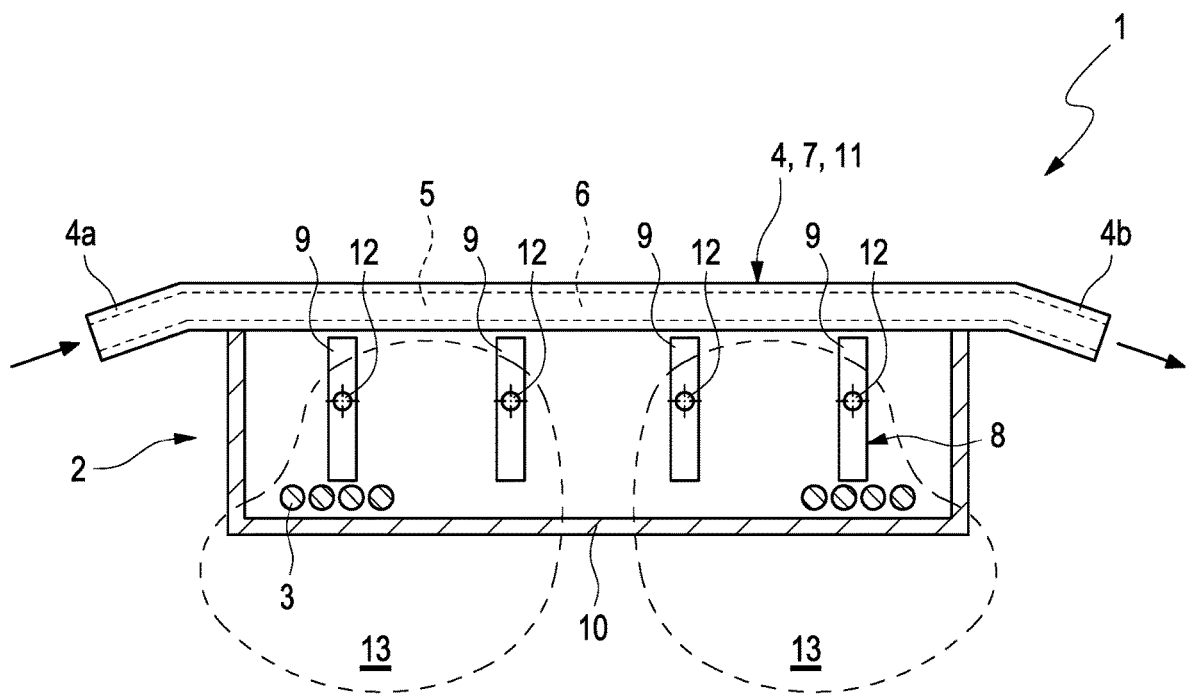
FIG. 2 shows a sectional view of an induction charging device according to the invention with a ferrite assembly whose multiple ferrite plates are in an open position.

FIG. 1 and FIG. 2 show sectional views of an induction charging device 1 according to the invention for a partially or fully electrically operated motor vehicle. The induction charging device 1 comprises a charging assembly 2 with a charging coil 3 and a temperature-control assembly 4. The temperature-control assembly 4 comprises a fluid passage 6 through which a fluid 5 can flow, which is formed in a metal shielding plate 7. The temperature-control assembly 4 can be flowed through by the fluid 5 from a fluid inlet 4a to a fluid outlet 4b and is fluidically connectable via the fluid inlet 4a and via the fluid outlet 4b to a vehicle cooling system—not shown here. The waste heat generated in the metal shielding plate 7 is then transportable via the fluid 5 in the fluid passage 6 to further elements of the motor vehicle and can be used for preheating a lubricating oil in an engine, for preheating the engine, for preheating the battery or even for preheating an interior of the motor vehicle.

Furthermore, the induction charging device 1 comprises a ferrite assembly 8 with multiple ferrite plates 9 arranged next to one another. The ferrite assembly 8 and the charging coil 3 are arranged in a shell-shaped charging housing 10 which is closed on the vehicle side with the metal shielding plate 7, which, here, forms a cover 11 of the charging housing 10. The term "on the vehicle side" in this context means that the metal shielding plate 7 or the cover 11, in an installed state of the induction charging device 1, is between the motor vehicle and the charging housing 10. The multiple ferrite plates 9 of the ferrite assembly 8 are each rotatably fixed in the charging housing on the same about an axis of rotation 12.

The ferrite assembly 8 comprises the multiple ferrite plates 9 which in each case are rotatable into a closed position and into an open position. In FIG. 1, the multiple ferrite plates 9 of the ferrite assembly 8 are shown in the closed position and in FIG. 2 the multiple ferrite plates 9 of the ferrite assembly 8 are shown in the open position. The respective ferrite plates 9 are arranged in the closed position parallel and in the open position at an angle—which can vary between 30° and 90°—to the charging coil 3.

In FIG. 1, the charging assembly 2 is in a charging state and the multiple ferrite plates 9 are in the closed position. In the charging coil 3, an induction alternating current flows and the battery of the motor vehicle—not shown here—is chargeable. In the metal shielding plate 7, negligibly eddy currents are generated. The charging power of the induction device 1 is high and in the metal shielding plate 7 a low amount of the waste heat is generated. Accordingly, the heating output of the temperature-control assembly 4 is also low.

In FIG. 2, the charging coil 3 is in a heating state and the multiple ferrite plates 9 are in the open position. In the charging coil 3 an alternating current flows. The electromagnetic field 13 can reach the metal shielding plate 7 almost without obstruction and in the metal shielding plate 7 eddy currents are generated and the generated waste heat and accordingly also the heating output of the temperature-control assembly 4 are high.

In summary, the electromagnetic field can be influenced in the induction charging device 1 according to the invention and because of this the amount of the waste heat generated in the metal shielding plate 7 changed. Because of this, the temperature-control assembly 4 can be used for preheating a lubricating oil in an engine, for preheating the engine, for preheating the battery or even for preheating an interior of the motor vehicle.

The invention claimed is:

1. An induction charging device for a partially or fully electrically operated motor vehicle, comprising:
   at least one charging assembly including a charging coil and a temperature-control assembly through which a fluid is flowable, the temperature-control assembly heat-transmittingly coupled to the at least one charging assembly;
   the charging coil inductively couplable to a primary coil such that a motor vehicle battery is inductively chargeable;
   the at least one charging assembly further includes (i) a ferrite assembly arranged on a vehicle side relative to the charging coil and (ii) a metal shielding plate arranged on the vehicle side relative to the ferrite assembly for shielding electromagnetic field emissions;
   the ferrite assembly arranged between the charging coil and the metal shielding plate;
   the ferrite assembly including a plurality of ferrite plates arranged next to one another, which are each rotatable into a closed position and into an open position;
   wherein a respective ferrite plate of the plurality of ferrite plates, when in the closed position, is arranged parallel to the charging coil and shields the metal shielding plate from the charging coil such that comparatively little waste heat is generatable in the metal shielding plate; and
   wherein the respective ferrite plate, when in the open position, is arranged at an angle relative to the charging coil and partially shields the metal shielding plate from the charging coil such that a comparatively large amount of waste heat is generatable in the metal shielding plate.

2. The induction charging device according to claim 1, wherein:
   the at least one charging assembly is switchable into a charging state; and
   when in the charging state, an induction alternating current flows in the charging coil and the motor vehicle battery is chargeable.

3. The induction charging device according to claim 2, wherein, when in the charging state, at least some of the plurality of ferrite plates are arranged in the closed position.

4. The induction charging device according to claim 1, wherein:
   the at least one charging assembly is switchable into a heating state; and
   when in the heating state, an alternating current flows in the charging coil and a waste heat is generatable in the at least one charging assembly.

5. The induction charging device according to claim 4, wherein, when in the heating state, at least some of the plurality of ferrite plates are arranged in the open position.

6. The induction charging device according to claim 1, wherein the temperature-control assembly includes at least one of:
   at least one fluid tube that heat-transmittingly lies against the metal shielding plate; and
   at least one fluid passage defined in the metal shielding plate.

7. The induction charging device according to claim 1, wherein:
   the temperature-control assembly includes a fluid inlet and a fluid outlet; and
   the temperature-control assembly is fluidically connectable to a vehicle cooling system via the fluid inlet and the fluid outlet.

8. The induction charging device according to claim 1, wherein:
   the at least one charging assembly includes a shell-shaped charging housing in which the charging coil and the ferrite assembly are arranged; and
   the metal shielding plate is structured as a cover of the charging housing and closes the charging housing on the vehicle side.

9. The induction charging device according to claim 8, wherein:
   the plurality of ferrite plates are disposed in the charging housing and are rotatably connected to the charging housing; and
   the plurality of ferrite plates are structured and arranged to actively steer a magnetic field at least one of (i) away from the metal shielding plate when in a charging state and (ii) to the metal shielding plate when in a heating state.

10. The induction charging device according to claim 8, wherein the charging housing is composed of an electrical insulator.

11. The induction charging device according to claim 1, further comprising an adjusting device structured and arranged to adjust the plurality of ferrite plates into the closed position and into the open position.

12. The induction charging device according to claim 1, wherein the respective ferrite plate extends at an angle of 30° to 90° relative to the charging coil when in the open position.

13. The induction charging device according to claim 1, wherein, when in the closed position, the respective ferrite plate is arranged and oriented such that an electromagnetic field provided by the primary coil is diverted away from the metal shielding plate and to the charging coil via the respective ferrite plate.

14. The induction charging device according to claim 1, wherein, when in the open position, the respective ferrite plate is arranged and oriented such that an electromagnetic field provided by the charging coil is directed to the metal shielding plate via the respective ferrite plate.

15. The induction charging device according to claim 1, wherein the plurality of ferrite plates are rotatable into a plurality of intermediate positions between the open position and the closed position.

16. The induction charging device according to claim 3, wherein:
the at least one charging assembly is switchable into a heating state;
when in the heating state, an alternating current flows in the charging coil and a waste heat is generatable in the at least one charging assembly; and
when in the heating state, at least some of the plurality of ferrite plates are arranged in the open position.

17. An induction charging device for a motor vehicle, comprising:
at least one charging assembly including a charging coil and a temperature-control assembly through which a fluid is flowable, the temperature-control assembly heat-transmittingly coupled to the at least one charging assembly;
the charging coil inductively couplable to a primary coil such that a motor vehicle battery is inductively chargeable;
the at least one charging assembly further includes (i) a ferrite assembly arranged on a vehicle side relative to the charging coil and (ii) a metal shielding plate arranged on the vehicle side relative to the ferrite assembly for shielding electromagnetic field emissions;
the ferrite assembly including a plurality of ferrite plates arranged next to one another between the charging coil and the metal shielding plate, the plurality of ferrite plates each rotatable into a closed position and into an open position;
wherein a respective ferrite plate of the plurality of ferrite plates is oriented transversely relative to the charging coil when in the open position;
wherein the respective ferrite plate is oriented parallel to the charging coil when in the closed position; and
wherein the respective ferrite plate shields a larger area of the metal shielding plate from the charging coil when in the closed position than when in the open position such that less waste heat is generatable in the metal shielding plate.

18. An induction charging device for a partially or fully electrically operated motor vehicle, comprising:
at least one charging assembly including:
a charging coil inductively couplable to a primary coil such that a motor vehicle battery is inductively chargeable;
a temperature-control assembly through which a fluid is flowable, the temperature-control assembly heat-transmittingly coupled to the at least one charging assembly;
a ferrite assembly arranged on a vehicle side relative to the charging coil;
a charging housing in which the charging coil and the ferrite assembly are arranged; and
a metal shielding plate arranged on the vehicle side relative to the ferrite assembly for shielding electromagnetic field emissions, the metal shielding plate disposed on and closing the charging house;
the ferrite assembly including a plurality of ferrite plates arranged next to one another between the charging coil and the metal shielding plate, the plurality of ferrite plates each rotatable into a closed position and into an open position;
wherein a respective ferrite plate of the plurality of ferrite plates is oriented transversely relative to the charging coil when in the open position;
wherein the respective ferrite plate is oriented parallel to the charging coil when in the closed position; and
wherein the respective ferrite plate shields a larger area of the metal shielding plate from the charging coil when in the closed position than when in the open position such that less waste heat is generatable in the metal shielding plate.

19. The induction charging device according to claim 18, wherein the temperature-control assembly includes at least one fluid tube that abuts against the metal shielding plate such that heat is transferable therebetween.

20. The induction charging device according to claim 18, wherein:
the temperature-control assembly includes the metal shielding plate; and
the metal shielding plate includes at least one fluid passage via which the fluid is flowable through the temperature-control assembly.

* * * * *